United States Patent
Triteyaprasert et al.

(10) Patent No.: US 7,248,796 B2
(45) Date of Patent: Jul. 24, 2007

(54) IMAGING APPARATUS AND METHOD, RECORDING MEDIUM, AND PROGRAM

(75) Inventors: Soroj Triteyaprasert, Tokyo (JP); Hidenori Kushida, Tokyo (JP)

(73) Assignee: Sony Corporation, Tokyo (JP)

( * ) Notice: Subject to any disclaimer, the term of this patent is extended or adjusted under 35 U.S.C. 154(b) by 333 days.

(21) Appl. No.: 11/089,671

(22) Filed: Mar. 25, 2005

(65) Prior Publication Data

US 2005/0212952 A1    Sep. 29, 2005

(30) Foreign Application Priority Data

Mar. 29, 2004   (JP) ............................... 2004-094791

(51) Int. Cl.
    G03B 13/32    (2006.01)
(52) U.S. Cl. ...................... 396/147; 396/89; 348/345; 348/346; 348/347
(58) Field of Classification Search .............. 396/147, 396/89; 348/345–347, 349, 218.1, 219.1, 348/355
    See application file for complete search history.

(56) References Cited

U.S. PATENT DOCUMENTS 6,118,943 A  *  9/2000  Ohsawa ...................... 396/51
6,327,437 B1 *  12/2001 Malloy Desormeaux .... 396/147
6,408,140 B1 *  6/2002  Malloy Desormeaux .... 396/429
6,765,618 B1 *  7/2004  Sato .......................... 348/348
6,771,899 B2 *  8/2004  Nonaka ...................... 396/121
7,027,728 B2 *  4/2006  Goris et al. ................. 396/121
2002/0191100 A1 * 12/2002 Matsunaga et al. ......... 348/345
2004/0052514 A1 *  3/2004 Hirai .......................... 396/89

* cited by examiner

*Primary Examiner*—David Bruce
*Assistant Examiner*—Nia Cook
(74) *Attorney, Agent, or Firm*—Frommer Lawrence & Haug LLP; William S. Frommer; Thomas F. Presson

(57) ABSTRACT

An image capturing apparatus includes: a focal position adjusting device operable to adjust a focal position of an optical system to a predetermined position in a first image capture period and change the focal position of the optical system in a second image capture period; a display operable to display an image captured in the first image capture period; a distribution generator operable to generate a distribution of sharpness corresponding to focal positions based on an image captured in the second image capture period; and a focused position detector operable to detect the focal position of the optical system, at which an image of a subject is in focus, based on the generated distribution of sharpness.

15 Claims, 11 Drawing Sheets

IMAGING APPARATUS AND METHOD, RECORDING MEDIUM, AND PROGRAM

CROSS REFERENCES TO RELATED APPLICATIONS

The present invention contains subject matter related to Japanese Patent Application JP 2004-094791 filed in the Japanese Patent Office on Mar. 29, 2004, the entire contents of which being incorporated herein by reference.

BACKGROUND OF THE INVENTION

1. Field of the Invention

The present invention relates to an imaging apparatus and method, a recording medium and a program, and more particularly relates to an imaging apparatus and method, a recording medium and a program, which are capable of focusing at any subject positioned inside an imaging field by enabling selection of a focused position.

2. Description of Related Art

An imaging apparatus having an automatic focusing mechanism, which is referred to as an auto-focus, is well-known to public.

The automatic focusing mechanism performs focusing operation to achieve a focus state by analyzing high frequency component of a signal for a captured image, detecting sharpness of the captured image, and controlling a position of a focus lens such that the high frequency component becomes maximum or local maximum. In other words, the automatic focusing mechanism controls the focusing at a subject image by using property such that the high frequency component in the image signal is increased since the image signal changes sharply at an edge of the subject image if the subject is in focus, and by adjusting positions of optical parts such as the focus lens and the like so that the high frequency component becomes maximum.

Further, Japanese Patent Publication JP 07-74856 discloses an automatic focus arranging method. In this method, an objective lens or a sample is moved from a sufficiently near focus point to a sufficiently remote focus point for capturing a still image while storing a position of the maximum contrast obtained within a range of this movement, and the focusing is performed by adjusting a distance between an subject and the objective lens in such a way that the contrast of the subject image becomes the maximum.

SUMMARY OF THE INVENTION

However, if the foregoing method is applied to capture a moving image, an image taken in the middle of operation for detecting the focused position may be displayed, thereby resulting an unsatisfactory or incomplete image.

Further, if a plurality of subjects exist inside the imaging field, there is a disadvantage such that one of the subjects which is not intended by a user is brought into focus. In such a case where the plurality of subjects can be brought into focus respectively, the user may be required to decide which one of the subjects is brought into focus. However, in order to enable the selection of the subject to be focused, the automatic focusing system may need to detect positions of a lens for focusing by actually moving the lens since sharpness of an image to be captured has to be detected in this system. However, if an image is captured while the lens position is being moved, an image during such a focused position detecting operation, in which no subject is brought into focus, is outputted or recorded, so there was a disadvantage that the user is prevented from obtaining only focused images.

Another method is devised to alleviate the above-described disadvantage. In the method, in order to select or change a target subject to be brought into focus without changing an imaging field, sharpness detection regions are displayed on a display for selection. Further, one of the regions on an image is selected by using a touch panel input mechanism, a line-of-sight input mechanism or the like, for specifying a position to be focused. However, in this method, when a plurality of subjects that may serve as potential focused positions in the imaging field are taken to be superimposed, it is difficult to select individual subject even if one of the sharpness detection region is specified by using the touch panel input mechanism, the line-of-sight input mechanism or the like, so there was a disadvantage that the user is prevented from finishing specifying an accurate position to be focused.

Accordingly, it is desirable to be able to properly focus at an arbitrary subject while detecting a focused position without making a displayed image illegible or incomplete even if there are a plurality of subjects within an imaging field, which may serve as a plurality of focused positions. The present invention is made in view of the situation described above.

An image capturing apparatus according to an embodiment of the present invention may include: focal position adjusting means for adjusting a focal position of an optical system to a predetermined position in a first image capture period and adjusting so as to change the focal position of the optical system in a second image capture period; displaying means for displaying an image captured in the first image capture period; distribution generating means for generating a distribution of sharpness corresponding to focal positions based on an image captured in the second image capture period; and focused position detecting means for detecting a focal position of the optical system, at which an image of a subject is in focus, based on the distribution of sharpness corresponding to the focal positions generated by the distribution generating means.

The first image capture period and the second image capture period may be alternately repeated.

The focal position adjusting means may be arranged in such a way that the focal position of the optical system is adjusted by moving the position of a focus lens.

The focal position adjusting means may be arranged in such a way that the focal position of the optical system relative to an image capturing device is adjusted by moving the position of the image capturing device.

The focal position adjusting means may be arranged in such a way that the focal position of the optical system relative to an image capturing device is adjusted by changing a form of the optical system.

In the second image capture period, the focal position adjusting means may be arranged such that the focal position is adjusted by moving the position of the focus lens with non-equal intervals.

The image capturing apparatus may further include focused position display image generating means for generating a focused position display image that indicates focused positions detected by the focused position detecting means.

The image capturing apparatus may further include image composing means for combining the focused position display image generated by the focused position display image generating means and the image captured in the first image capture period. Further, the display means may be adapted to display the image captured in the first image capture period that is combined with the focused position display image.

The image capturing apparatus may further include selecting means for selecting a focused position from the focused position display image generated by the focused position display image generating means. The focal position adjusting means may be arranged such that the focal position of the image captured in the first image capture period is adjusted to a focal position corresponding to the focused position selected by the selecting means.

The image capturing apparatus may further include zoom setting means for controlling zoom operation of the optical system. The focal position adjusting means may be arranged such that the focal position of the optical system is adjusted to a predetermined position in response to the zoom status set by the zoom setting means in the first image capture period, and recalculate the focused position of the optical system obtained in the second image capture period in response to the zoom status set by the zoom setting means.

An image capturing method according to an embodiment of the present invention includes the steps of: adjusting a focal position of an optical system to a predetermined position in a first image capture period and adjusting so as to change the focal position of the optical system in a second image capture period; displaying an image captured in the first image capture period; generating a distribution of sharpness corresponding to focal positions based on an image captured in the second image capture period; and detecting the focal position of the optical system, at which an image of a subject is in focus, based on the generated distribution of sharpness corresponding to the focal positions.

A program stored in a recording medium according to an embodiment of the present invention includes: a focal position adjusting control step of controlling an adjustment of a focal position of an optical system to a predetermined position in a first image capture period and an adjustment to change the focal position of the optical system in a second image capture period; a display control step of controlling a displaying of an image captured in the first image capture period; a distribution generation control step of controlling a generation of a distribution of sharpness corresponding to the focal positions based on the image captured in the second image capture period; and a focused position detection control step of controlling a detection of a focal position of the optical system, at which an image of a subject is in focus, based on the distribution of sharpness corresponding to the focal positions generated by the process of the distribution generation control step.

A program according to an embodiment of the present invention instructs a computer to execute: a focal position adjusting control step of controlling an adjustment of a focal position of an optical system to a predetermined position in a first image capture period and an adjustment to change the focal position of the optical system in a second image capture period; a display control step of controlling a displaying of an image captured in the first image capture period; a distribution generation control step of controlling a generation of a distribution of sharpness corresponding to the focal positions based on the image captured in the second image capture period; and a focused position detection control step of controlling a detection of a focal position of the optical system, at which an image of a subject is in focus, based on the distribution of sharpness corresponding to the focal positions generated by the process of the distribution generation control step.

In the image capturing apparatus, method and program according to the embodiments of the present invention, in the first image capture period, the focal position of the optical system is adjusted to the predetermined position, and in the second image capture period, the focal position of the optical system is adjusted to be changed. Further, the image captured in the first image capture period is displayed, and based on the image captured in the second image capture period, the distribution of sharpness corresponding to the focal positions is generated. Further, based on the distribution of sharpness based on the focal positions, a focal position of the optical system in which the image of a subject becomes in the focused state is detected.

The image capturing apparatus according to the embodiment of the present invention may be an independent apparatus or may be a block for carrying out an image capturing processing.

According to the embodiments of the present invention, it is possible to detect the focused position without making the display image illegible or incomplete. Further, the embodiments of the present invention makes it easy to properly set a focused position for any arbitrary subject.

BRIEF DESCRIPTION OF THE DRAWINGS

The above and other objects, features and advantages of the present invention will become more apparent from the following description of the presently exemplary embodiment of the invention taken in conjunction with the accompanying drawings, in which.

DETAILED DESCRIPTION OF EMBODIMENTS

Figure 1:
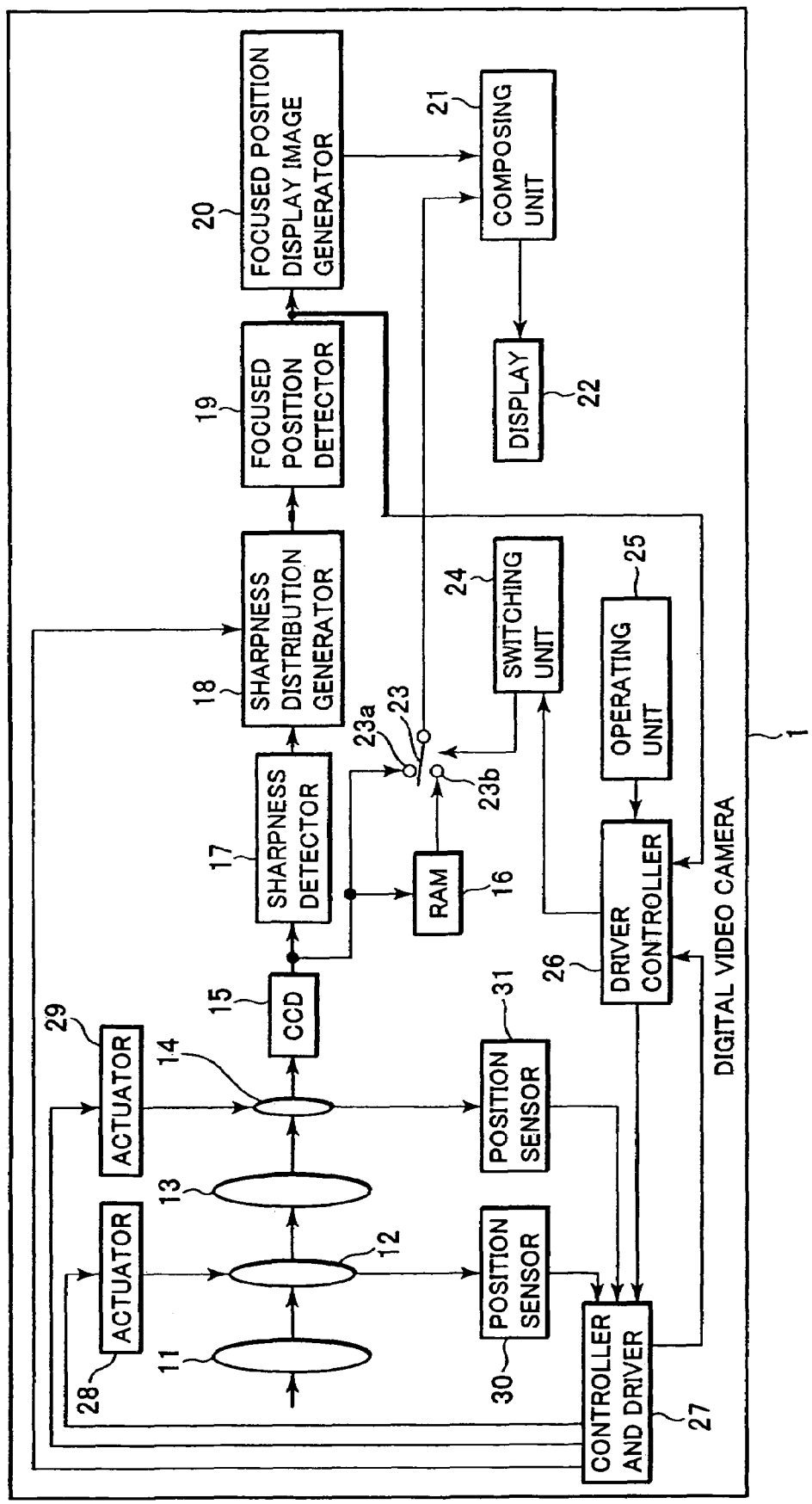
FIG. 1 is a block diagram showing a configuration of a digital video camera to which an embodiment of the present invention is applied.

An image capturing apparatus according to an embodiment of the present invention includes: focal position adjusting means (for example, a driver controller 26 of FIG. 1) for adjusting a focal position of an optical system in a first image capture period to a predetermined position and adjusting so as to change the focal position of the optical system in a second image capture period; displaying means (for example, a display 22 for displaying an image provided in the condition where a switching unit 24 of FIG. 1 connects a switch 23 to a terminal 23a for the first image capture period) for displaying an image captured in the first image capture period; distribution generating means (for example, a sharpness distribution generator 18 of FIG. 1) for generating a distribution of sharpness based on the focal positions in accordance with the image captured in the second image capture period; and focused position detecting means (for example, a focused position detector 19 of FIG. 1) for detecting the focal position of the optical system in which an image of a target subject becomes in a focused state, based on the distribution of sharpness based on the positions of the focuses generated by the distribution generating means.

The image capturing apparatus according to the present embodiment may further include focused position display image generating means (for example, a focused position display image generator 20 of FIG. 1) for generating a focused position display image that indicates focused positions detected by the focused position detecting means.

The image capturing apparatus according to the present embodiment may further include image composing means (for example, a composing unit 21 of FIG. 1) for combining the focused position display image generated by the focused position display image generating means and the image captured in the first image capture period. Further, the display may be arranged so as to display the composite image obtained by combining the image captured in the first image capture period and the focused position display image.

The image capturing apparatus according to the present embodiment may further include selecting means (for example, an operating unit 25 of FIG. 1) for selecting a focused position from the focused position display image generated by the focused position display image generating means. The focal position adjusting means may be arranged so as to adjust the focal position used in the first image capture period to a focal position corresponding to the focused position selected by the selecting means.

The image capturing apparatus according to the present embodiment may further include zoom setting means (for example, the driver controller 26 of FIG. 1) for controlling zoom operation of the optical system. The focal position adjusting means may be arranged so as to adjust the focal position of the capturing optical system to a predetermined position in response to the zoom status set by the zoom setting means in the first image capture period, and recalculate the focused position of the optical system obtained in the second image capture period in response to the zoom status set by the zoom setting means.

Figure 6:
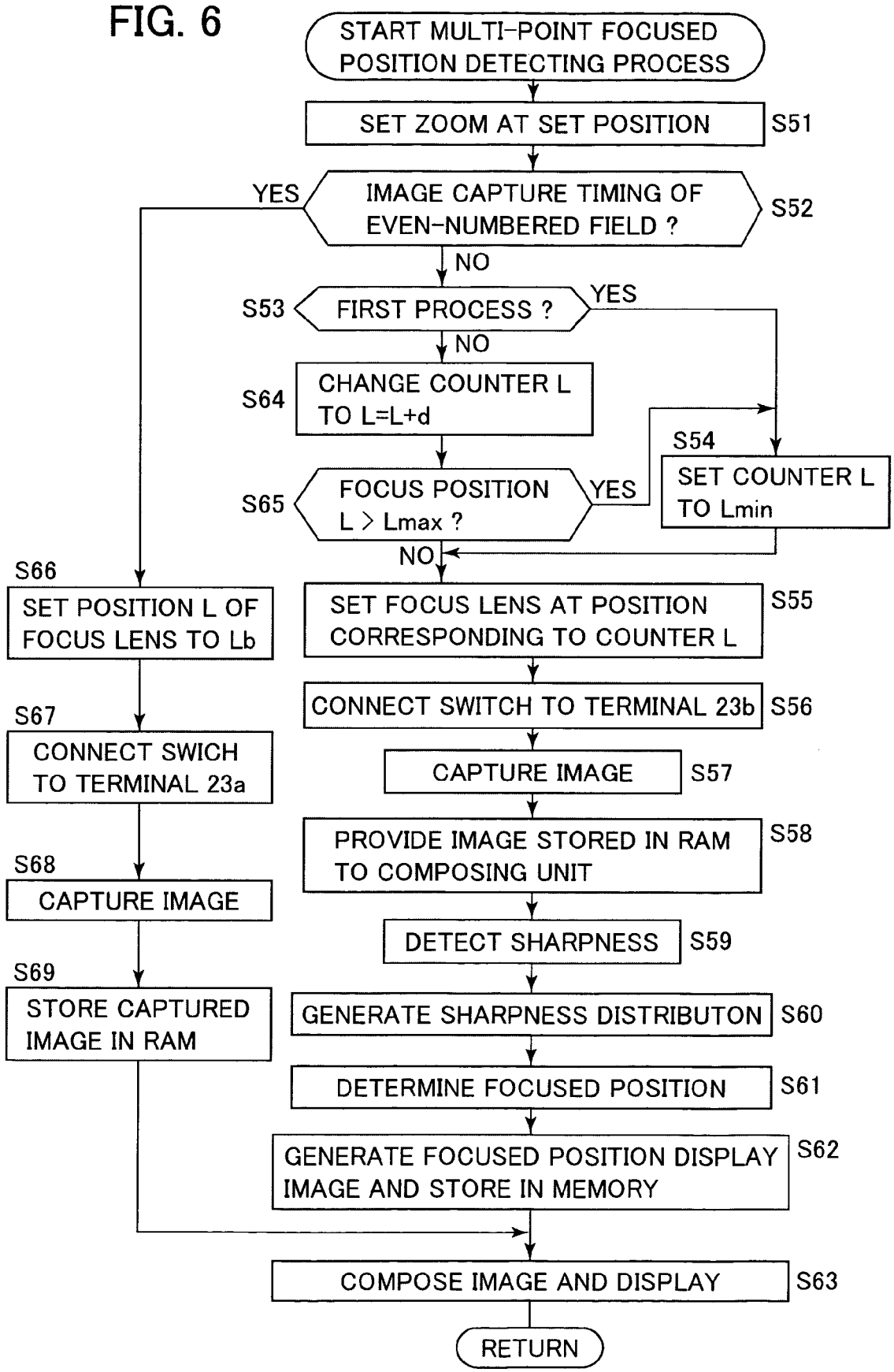
FIG. 6 is a flowchart explaining a multi-point focused position detecting process in the flowchart in FIG. 2.

An image capturing method according to an embodiment of the present invention includes the steps of: adjusting a focal position of an optical system captured in a first image capture period to a predetermined position and adjusting so as to change the focal position of the optical system captured in a second image capture period (processes at steps S55, S56 in a flowchart of FIG. 6); displaying the image captured in the first image capture period (a process at a step S63 in the flowchart of FIG. 6); generating a distribution of sharpness based on the focal positions based on the image captured in the second image capture period (a process at a step S60 in the flowchart of FIG. 6); and detecting the focal position of the optical system in which an image of a subject becomes in a focused state based on the distribution of sharpness based on the focal positions generated (a process at a step S61 in the flowchart of FIG. 6).

Similar mapping relationships hold for a recording medium and a program according to embodiments of the present invention as that of the image capturing method. Accordingly, their corresponding descriptions are omitted for the purpose of simplifying the description.

A digital video camera 1 according to an embodiment of the present invention will be described below with reference to the accompanying drawings.

A fixed lens 11 collects lights that forms an image of an imaging field and guides them to a zooming lens 12 to transmit therethrough. The zooming lens 12 is controlled to move by an actuator 28 in the right and left directions in the drawing, and by adjusting the image light of imaging field depending on its position, an image of the imaging field is enlarged or reduced, and passed through a field lens 13 disposed at the following stage.

The field lens 13 is a fixed lens and guides the image light of an imaging field, whose zoom size is adjusted by the zooming lens 12, to a focus lens 14. An operation of the focus lens 14 is controlled by an actuator 29. The movement to the right or left direction in the figure changes the focal position of the image light of imaging field. The focus lens 14 guides an image to be formed to a CCD image sensor 15.

In the present specification, the focal position is a position at which an image of a subject located at an infinitely remote position is formed by an optical system block (the block may include the fixed lens 11, the zooming lens 12, the field lens 13 and the focus lens 14). Further, the operation for changing the focal position is equivalent to an operation to change a distance from the optical block to the subject whose image is formed on the CCD image sensor 15.

In other words, for the same optical zoom magnification, if a distance from the focal position to the CCD image sensor 15 is larger, a subject in the image existing at a relatively closer position from the optical block would be in focus, and if the distance from the focal position to the CCD image sensor 15 is smaller, a subject in the image existing at a relatively far position from the optical block would be in focus.

Regularly, in the case of capturing an image of a subject, it is obviously difficult to change the distance from the optical block to the subject. Accordingly, the subject is brought into focus by adjusting the optical block to change the focal position of the optical block. Here, the focal position is changed by changing the positions of the zooming lens 12 and focus lens 14 in the optical block.

Further, a focal position of the optical system at which an image of a subject formed by the optical block becomes in the focused state (or a focal position of the optical system at which a subject is in-focus) is referred to as a focused position in the present specification. Accordingly, if a plurality of subjects exist in the imaging field at different distances from the optical block, a plurality of potential focused positions exist, which respectively correspond to individual positions of the subjects. The focused positions correspond to distances to the subjects when they are viewed from the optical block.

For example, if there are a subject positioned at a remote location and a subject positioned at a closer location in the same image when they are viewed from the optical block and if the position of the focus lens 14 is changed sequentially in such a way that the focal position viewed from the CCD image sensor 15 is changed from a remote position to a closer position, the closer subject becomes in the focused state first at a certain position (referred to as a first focused position), and then the remote subject becomes in the focused state at another position (referred to as a second focused position).

The CCD (Charge Coupled Device) 15 photo-electrically converts light passed through the focus lens 14 into voltage values at respective pixel units, and thereby generating an image signal to supply to a sharpness detector 17, a RAM 16 and a terminal 23a of a switch 23.

The sharpness detector 17 determines the sharpness of an image based on the image signal sent from the CCD image sensor 15, subsequently determines an evaluation value based on the sharpness, and sends the sharpness and evaluation values to the sharpness distribution generator 18. More specifically, for example, the sharpness detector 17, after performing a sharpness improving process such as a Laplacian filtering and the like on the image sent from the CCD image sensor 15, determines the number of pixels constituting an edge of the image having a predetermined pixel value or more, and sends the number of pixels as an evaluation value of the sharpness to the sharpness distribution generator 18. In the present invention, the filter used in the sharpness improving process is not limited to only the Laplacian filtering, and another filtering having the similar function may be employed. Further, the evaluation value of sharpness is not limited to the value determined by the foregoing manner, and other types of values determined by different methods may also be employed. For example, magnitudes of contrasts between pixels may be used as the evaluation value of sharpness.

The sharpness distribution generator 18 generates a distribution of sharpness with respect to positions of the focus lens 14 based on: information regarding current positions of the focus lens 14 provided through a controller and driver 27 from a position sensor 31; information regarding current position of the zooming lens 12 provided from a position sensor 30; and the evaluation value of sharpness provided from the sharpness detector 17. Further, the sharpness distribution generator 18 sends the generated sharpness distribution to the focused position detector 19.

The focused position detector 19 detects focus lens positions corresponding to focused positions based on the sharpness distribution, and sends the focus lens positions to the focused position display image generator 20. The sharpness distribution is prepared such that the vertical axis indicates the position of the focus lens 14 and the horizontal axis indicates the evaluation value of sharpness. Accordingly, the focused position detector 19 enables to detect positions of the focus lens 14 where sharpness of the sharpness distribution has a local maximum value or at an inflection point, as the focus lens positions corresponding to the focused positions. In other words, at the position of the focus lens 14 where the sharpness of the sharpness distribution has a local maximum value or an inflection point, the sharpness is high (or in the focused state), thereby indicating that a captured image is regarded as in focus (an image of a subject becomes in focus). Further, the position of the focus lens 14 at that time is detected as the focus lens position corresponding to the focused position.

The focused position display image generator 20 generates an image that allows a user to visually recognize the focused positions, and sends the generated image to the composing unit 21.

The composing unit 21 combines the focused position display image sent from the focused position display image generator 20 and the image signal sent from the CCD image sensor 15 by superimposing these images, and displays on the display 22, which may be a CRD (Cathode Ray Tube), LCD (Liquid Crystal Display), a plasma display panel (PDP), an organic light emission diode (OLED), a thin film electro-luminescence display (TFEL), a field emission display (FED) or the like.

The RAM 16 temporarily stores data corresponding to one field of the image signal sent from the CCD image sensor 15, delays by a timing corresponding to the one field and sends to a terminal 23b.

The switching unit 24 switches the switch 23 to the terminal 23a or 23b based on a signal sent by the driver controller 26 for identifying whether the image currently being captured, belongs to an even-numbered field or odd-numbered field. In other words, the switching unit 24 connects the switch 23 to the terminal 23a in the case of the even-numbered field, and connects to the terminal 23b in the case of the odd-numbered field. Here, as mentioned above, the RAM 16 delays for a time period corresponding to the one field the image data corresponding to the one field, and sends to the terminal 23b. Accordingly, if the CCD image sensor 15 sends the even-numbered field, the switch 23 sends the image of the even-numbered field from the terminal 23a to the composing unit 21, and the image of the even-numbered field is stored in the RAM 16 at the same timing. If the CCD image sensor 15 sends the odd-numbered field in the following timing, the even-numbered field of the immediate preceding field, which is stored in the RAM 16, is sent from the switch 23 to the composing unit 21 since the switch 23 is connected to the terminal 23b, thereby repeating these processes.

As a result, only the image of the even-numbered field is sent from the switch 23 to the composing unit 21.

The operating unit 25 may include a switch, a button and/or the like, which are operated when a user sends instructions regarding the focal position, the zoom or the like to the digital video camera 1. An operation signal in response to the operation instruction is sent to the driver controller 26. The operating unit 25 may be configured as a so-called touch panel. The touch panel may be integrated with the display 22.

The driver controller 26 sends a signal for controlling operations of the zooming lens 12 and focus lens 14, which correspond to the operation signals from the operating unit 25, to the controller and driver 27 while using position information of the zooming lens 12 and focus lens 14 which is fed back from the controller and driver 27. Further, the driver controller 26 sends a signal for indicating if the field currently captured by the CCD image sensor 15 is the even-numbered field or odd-numbered field, to the switching unit 24. Further, the driver controller 26 causes to operate the focus lens 14 in such a way that a distance from the optical block to a subject where an image becomes in the focused state is varied from the intermittently nearest position to a intermittently remote position, so as to detect the focused position that serves as a reference (hereafter, referred to as a reference focused position). The driver controller 26 further causes to detect the position of the focus lens 14 corresponding to the reference focused position. Moreover, after the detection of the reference focused position, the driver controller 26 controls the controller and driver 27, sets the focus lens 14 to the position corresponding to the reference focused position for the even-numbered field, and varies the position of the focus lens 14 step-wisely for the odd-numbered field.

The controller and driver 27, upon receiving a control signal from the driver controller 26, calculates respective movement directions and distances based on position information of the zooming lens 12 and focus lens 14, which is sent from the position sensors 30, 31, operates the actuators 28, 29 based on the calculation result, and then moves the zooming lens 12 and the focus lens 14 to the positions corresponding to the control signal. Moreover, the controller and driver 27 feeds the position information of the zooming lens 12 and focus lens 14 back to the driver controller 26 and simultaneously sends to the sharpness distribution generator 18.

The capturing process of the digital video camera in FIG. 1 will be described below with reference to the flowchart of FIG. 2.

At a step S1, an initializing process is executed.

Here, the initializing process is explained with reference to a flowchart of FIG. 3.

At a step S21, the driver controller 26 controls the controller and driver 27 to set the zooming lens 12 to a default zoom position. More specifically, when the default zoom is single magnification, the driver controller 26 instructs the controller and driver 27 to move the zooming lens 12 to a position where the single magnification zoom can be attained. In response to this instruction, the controller and driver 27 determines the direction and distance to the position where the single magnification zoom can be attained based on the position information of the zooming lens 12 sent from the position sensor 30, and operates the actuator 28 to move the zooming lens 12 with the corresponding movement direction and distance.

At a step S22, the driver controller 26 sets a counter L to Lmin, and controls the controller and driver 27 to set a position L of the focus lens 14 to a position where the image becomes in the focused state and the distance from the optical block to the subject is the shortest, namely, set the focal position of the optical system to the position corresponding to the counter L=Lmin. More specifically, the driver controller 26 instructs the controller and driver 27 to move the focus lens 14 to the position Lmin where the focal position is the most remote position from the CCD image sensor 15 within a scanning range for the position of the zooming lens 12. In response to this instruction, the controller and driver 27 determines the direction and distance to the Lmin based on the position information of the focus lens 14 sent by the position sensor 31, and operates the actuator 29 to move the focus lens 14 by the corresponding movement direction and distance. In the following description, the similar processes are used for moving the zooming lens 12 and focus lens 14. Accordingly, descriptions of the operations of the controller and driver 27, actuators 28, 29 and position sensors 30, 31 are omitted for the sake of simplification.

At a step S23, the driver controller 26 controls the switching unit 24 to connect the switch 23 to the terminal 23a.

At a step S24, the CCD image sensor 15 captures the image formed from light transmitted through the fixed lens 11, the zooming lens 12, the field lens 13 and the focus lens 14, and sends as an image signal to the sharpness detector 17, the RAM 16 and the terminal 23a of the switch 23. Now, since the switch 23 is connected to the terminal 23a, this process causes to send the captured image to the composing unit 21.

At a step S25, the sharpness detector 17 detects the sharpness of the image sent by the CCD image sensor 15. In other words, the sharpness detector 17, for examples, performs the Laplacian filtering on the image signal to improve the sharpness, and then sends the number of the pixels where the pixel value is a predetermined value or more, namely, the number of the pixels having a high possibility of forming the edge, as the evaluation value of sharpness to the sharpness distribution generator 18.

At a step S26, the sharpness distribution generator 18 generates a sharpness distribution based on information regarding the position of the focus lens 14 sent by the position sensor 31 and the sharpness data sent by the sharpness detector 17, and sends the generated sharpness distribution to the focused position detector 19. The sharpness distribution is a distribution represented in a form such that the horizontal axis indicates the position of the focus lens and the vertical axis indicates the sharpness, and formed by accumulating the position information of the focus lens and the information of the sharpness, which are repeatedly sent.

At a step S27, the focused position detector 19 judges whether or not any focused position is detected based on the sharpness distribution sent by the sharpness distribution generator 18. More specifically, the focused position detector 19 detects the position of the focus lens corresponding to the focused position based on the sharpness distribution and based on a judgment of whether or not any local maximum point or inflection point of the sharpness of the image is detected. At the step S27, if the focused position is not detected, the driver controller 26 carries out an increment of the counter L by a predetermined interval d at a step S28.

At a step S29, the driver controller 26 judges whether or not the counter L is greater than a maximum value Lmax. If the counter L is judged not to be greater, the process proceeds to a step S30, and controls the controller and driver 27 to set the position of the focus lens 14 to the position L, and the process returns to the step S24.

If the focused position is detected at a step S27, at a step S32, the driver controller 26 sets a value L−d corresponding to the detected focused state in which d is subtracted from the counter L, as a focus lens position Lb corresponding to the reference focused position, and also sets the focus lens 14 to a position corresponding to the counter L=Lb. In other words, the local maximum point or inflection point of the sharpness cannot be detected unless the focus lens 14 is located at a position where the actual sharpness exceeds the local maximum point or inflection point. Thus, the position (L−d) returned by the distance d from the position of the focus lens 14 where the local maximum point or inflection point of the sharpness is detected is set as the position where it becomes in the focused state.

At a step S33, the composing unit 21 displays the captured image sent by the switch 23 on the display 22. In other words, in the initializing process, the focused position display image is not generated since the focused position display image generator 20 has not been generated. Thus, the composing unit 21 displays the image sent by the switch 23 in its original state on the display 22.

At a step S29, if the counter L is judged to be greater than the Lmax, at a step S31, the focused position detector 19 judges if tendency of change in the generated sharpness distribution is monotonous increase or monotonous decrease. If the change tendency is the monotonous increase, it sets Lmax+d for the counter L, and if the change tendency is the monotonous decrease, it sets Lmin+d for the counter L. Next, the process proceeds to a step S32.

Figure 4:
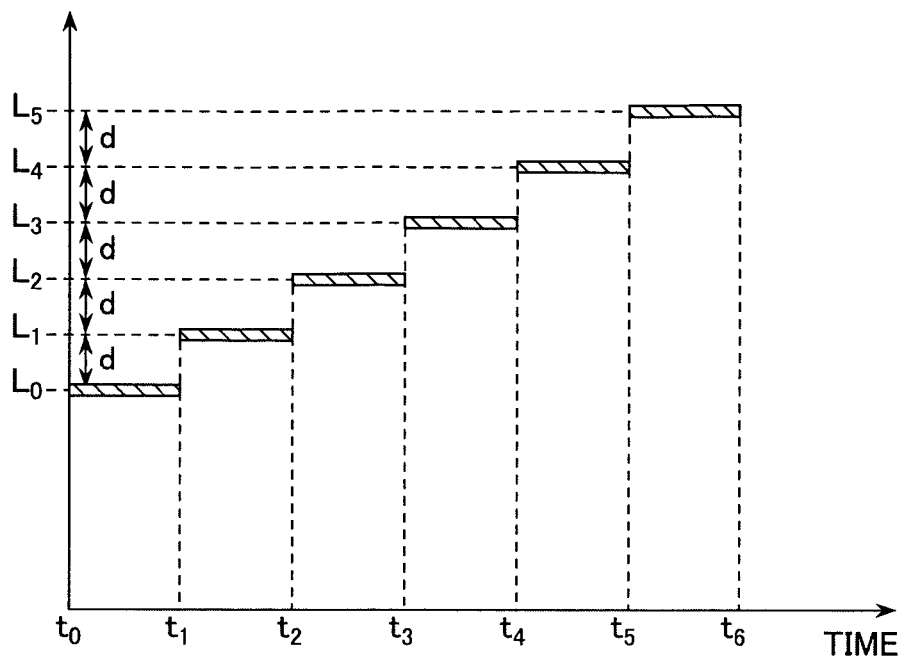
FIG. 4 is a view explaining a change in a position of a focus lens in the initializing process.

In other words, the repetition of the processes at the steps S24 to 30 causes the position of the focus lens 14 to be moved from L0 as Lmin to positions L1 to L5 (Lmax is L5) with the interval distance of d. In FIG. 4, the vertical axis indicates the position of the focus lens 14, and the scanning range (the positions from L0 to L5) is set depending on the position of the zooming lens. Further, the horizontal axis indicates the time. In the present example, in a period from a time t0 to a time t1, a first field is captured. In a period from the time t1 to a time t2, a second field is captured. In a period from the time t2 to a time t3, a third field is captured. In a period from the time t3 to a time t4, a fourth field is captured. In a period from the time t4 to a time t5, a fifth field is captured. Further, in a period from the time t5 to a time t6, a sixth field is captured.

In other words, as shown in FIG. 4, in the times t0 to t1 where the first field is captured, the focus lens 14 is set to the position corresponding to the counter L0. In the times t1 to t2 where the second field is captured, the focus lens 14 is set to the position corresponding to the counter L1. Moreover, in the times t2 to t3 where the third field is captured, the focus lens 14 is set to the position corresponding to the counter L2. Further, in the times t3 to t4 where the fourth field is captured, the focus lens 14 is set to the position corresponding to the counter L3. Moreover, in the times t4 to t5 where the fifth field is captured, the focus lens 14 is set to the position corresponding to the counter L4. Further, in the times t5 to t6 where the sixth field is captured, the focus lens 14 is set to the position corresponding to the counter L5. In other words, in FIG. 4, the position of the focus lens 14 is changed at the six steps in the right or left direction in FIG. 1. For example, when the leftmost position in FIG. 1 corresponds to the position L0 of FIG. 4, the focus lens 14 is moved at the six steps to the right direction at the interval distance of d, and the focal position is changed accordingly.

Figure 5:
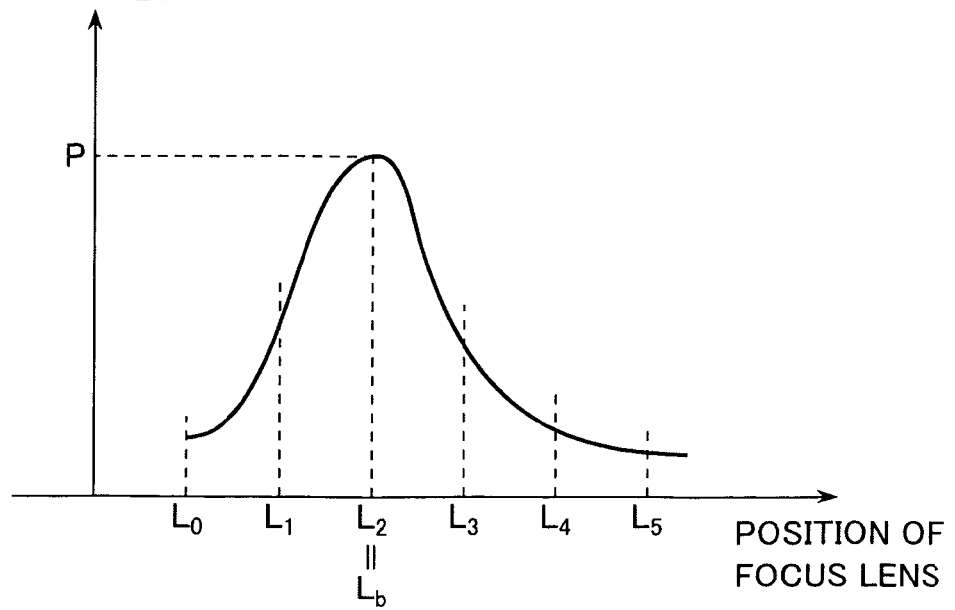
FIG. 5 is a view explaining a sharpness distribution.

Furthermore, with the process at the step S25, the sharpness distribution generator 18 detects the sharpness for each position of focus lens 14, and generates the sharpness distribution, for example, as shown in FIG. 5. In FIG. 5, the vertical axis indicates the sharpness, and the horizontal axis indicates the position of the focus lens 14. In FIG. 5, when the position of the focus lens 14 is the position L2, the sharpness indicates an local maximum value p. Thus, when the counter L=L3, at the step S27, the focused state is detected. Thus, for example, on and after the counter L4, the processes at the steps S24 to S30 are not performed. Moreover, the focus lens 14 is set to the position corresponding to the counter L=L2, and the image captured in this state is displayed on the display 22.

As a result, the focus lens 14 is set to the position Lb of the focus lens corresponding to the reference focused position. This means that the captured image is displayed, in which the nearest subject within a capture range is focused from the optical block.

Figure 2:
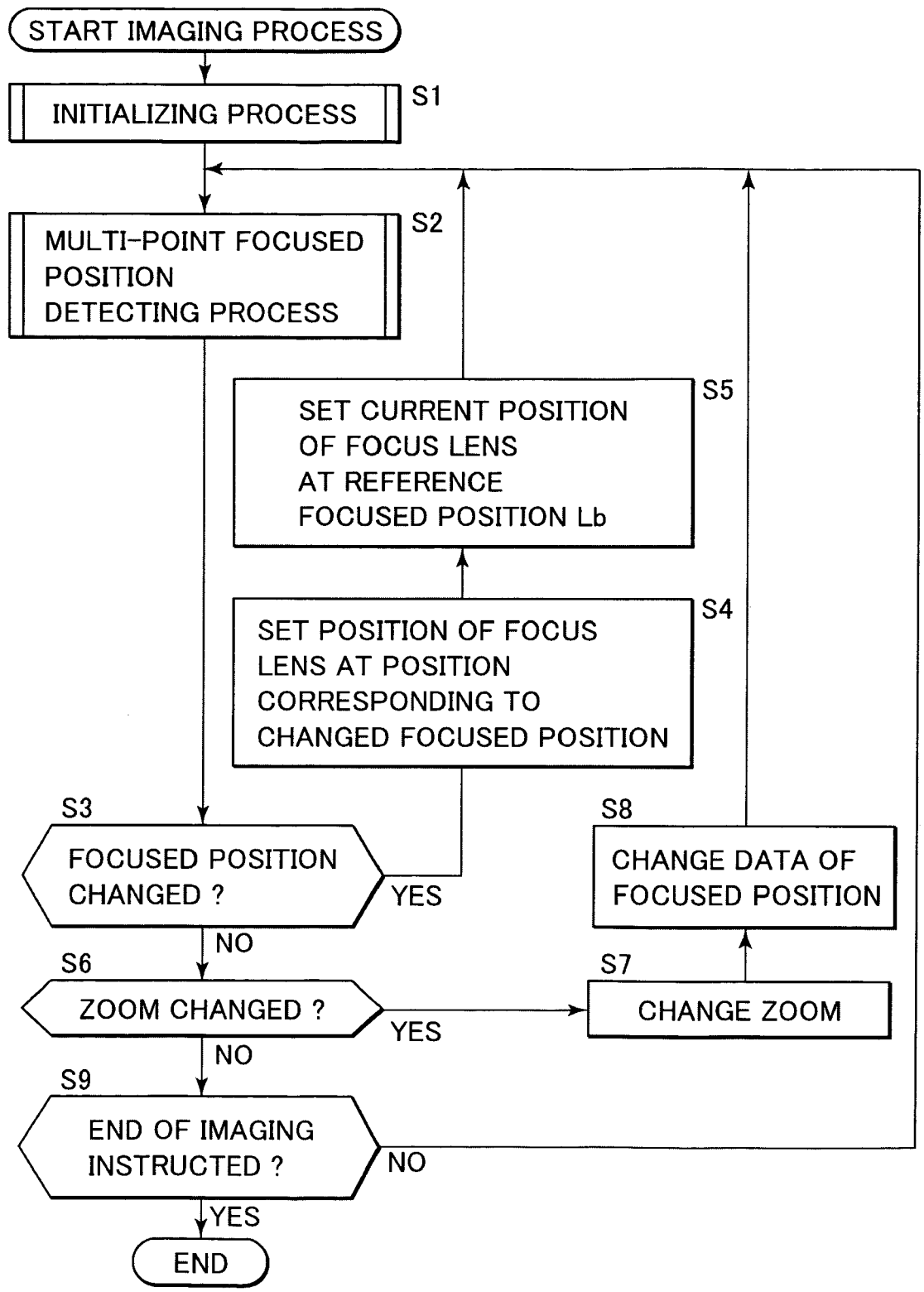
FIG. 2 is a flowchart explaining a capturing process.

The description returns to the flowchart in FIG. 2.

At the step S2, a multi-point focused position detecting process is executed.

Here, the multi-point focused position detecting process is explained with reference to a flowchart in FIG. 6.

At the step S51, the driver controller 26 sets the zooming lens 12 at the set position. In other words, in the case of the first process, with the process at the step S1, if the default is single magnification, the zooming lens 12 is set to the position corresponding to the single magnification zoom. In the case thereafter, the position of the zooming lens is set by the process at the step S7 which will be described later.

At the step S52, the driver controller 26 judges whether or not the field of the image currently being captured is the even-numbered field. Here, the field number is assumed to be sequentially incremented, one by one, with the start number of 1. Thus, for example, in the first process, since this field is the first field, it is judged that the field is not the even-numbered field, and the process proceeds to a step S53.

At the step S53, the driver controller 26 judges whether or not it is the first process. For example, if it is the first process, the controller 26 sets the counter L to the minimum value Lmin at a step S54. In other words, in the case of FIG. 4, if the focus lens 14 is constructed to allow movement with the six steps from L0 to L5, the minimum value Lmin becomes the position L0.

At a step S55, the driver controller 26 sets the focus lens 14 to a position corresponding to the counter L.

At a step S56, the driver controller 26 controls the switching unit 24 to connect the switch 23 to the terminal 23b.

At a step S57, the CCD image sensor 15 captures an image formed from light transmitted through the fixed lens 11, the zooming lens 12, the field lens 13 and the focus lens 14, and sends as an image signal to the sharpness detector 17, the RAM 16 and the terminal 23a of the switch 23.

At a step S58, the RAM 16 sends an image of the field captured immediately before, through the terminal 23b and the switch 23, to the composing unit 21. In other words, the image, which is not captured by the CCD image sensor 15 and is stored in the RAM 16, is sent to the composing unit 21.

Figure 3:
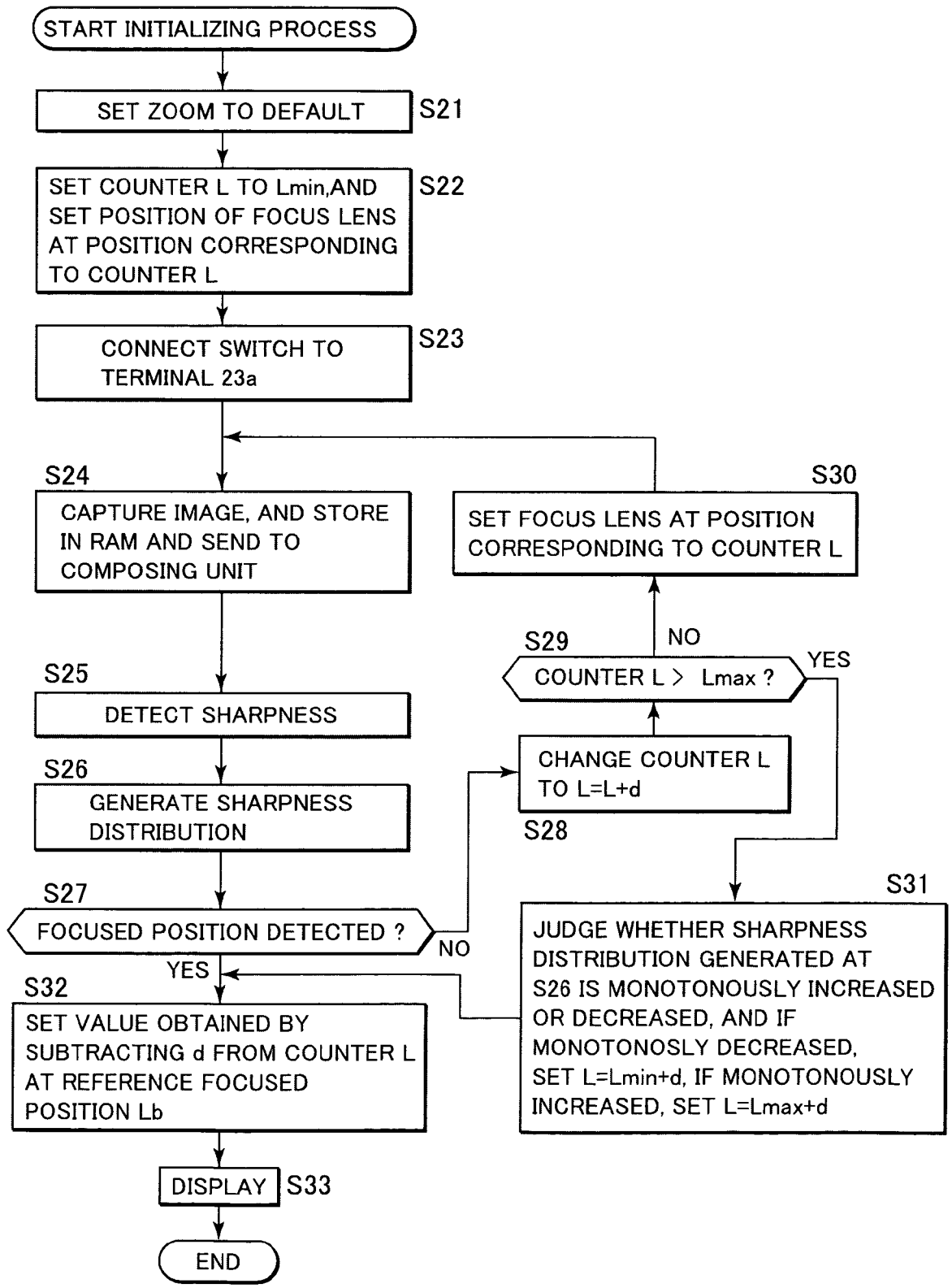
FIG. 3 is a flowchart explaining an initializing process in the flowchart in FIG. 2.

At a step S59, with similar way as in the process at the step S25 of the flowchart in FIG. 3, the sharpness detector 17 calculates the sharpness from the image sent by the CCD image sensor 15 and sends the sharpness to the sharpness distribution generator 18.

At a step S60, with similar way as in the process at the step S26 of the flowchart in FIG. 3, the sharpness distribution generator 18 generates the sharpness distribution based on information regarding the position of the focus lens 14 sent by the position sensor 31 and the sharpness sent by the sharpness detector 17, and sends to the focused position detector 19.

At a step S61, with similar way as in the process in which the presence or absence of the focused position is judged in the process at the step S26 of the flowchart in FIG. 3, the focused position detector 19 detects the focused position from the sharpness distribution sent by the sharpness detector 17, and sends to the focused position display image generator 20. In this process, there may be a case such that no focused position is detected. In such a case, information indicating that no focused position is detected is sent.

At a step S62, the focused position display image generator 20 generates a focused position display image based on the information of the focused position sent by the focused position detector 19, and stores in a built-in memory (not shown in the figure).

At a step S63, the composing unit 21 combines the focused position display image stored in the built-in memory (not shown in the figure) of the focused position display image generator 20 and the image of the immediate preceding field sent from the RAM 16 by superimposing these images, and displays the combined image on the display 22.

On the other hand, at the step S53, if it is judged that the process is not the first process, at a step S64, the driver controller 26 increments the counter L by d. At a step S65, the driver controller 26 judges whether or not the counter L is greater than the maximum value Lmax. If it is greater, the process proceeds to a step S54. If it is judged not to be greater, the process proceeds to a step S55.

In other words, at a step S64, if the counter L prior to the process is L1 as shown in FIG. 4, the counter L is incremented by d and becomes L2. As a result, at the step S55, the focus lens 14 is set to the corresponding position. Further, if the counter L prior to the process is L5 as shown in FIG. 4, the counter L is incremented by d and exceeds the maximum value L5. As a result, the counter L is returned to the minimum value at the step S54.

Further, at the step S52, if it is the even-numbered field, the process proceeds to a step S66. The driver controller 26 sets the position of the focus lens 14 to the position Lb corresponding to the reference focused position determined by the process at the step S1.

At a step S57, the driver controller 26 connects the switch 23 to the terminal 23a. At a step S68, the CCD image sensor 15 captures an image formed from light transmitted through the fixed lens 11, the zooming lens 12, the field lens 13 and the focus lens 14 and sends as an image signal to the sharpness detector 17, the RAM 16 and the terminal 23a of the switch 23.

At a step S69, the RAM 16 stores the image sent by the CCD image sensor 15, and the process proceeds to the step S63.

Figure 7:
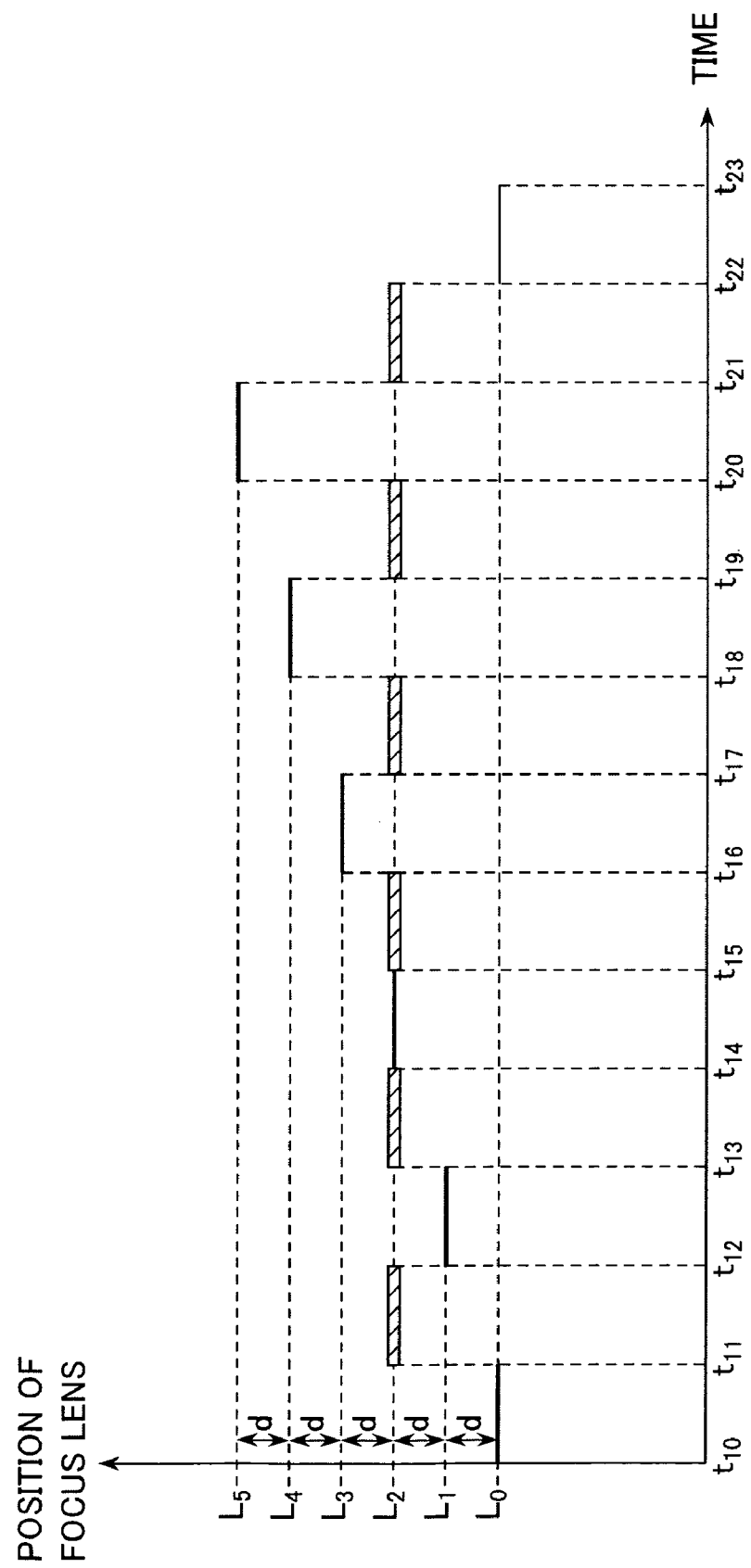
FIG. 7 is a view explaining a change in a position of a focus lens in the multi-point focused position detecting process.

The repetition of the foregoing processes causes the focus lens 14 to be operated as shown in FIG. 7. In FIG. 7, in similar way as in FIG. 4, the vertical axis indicates the position of the focus lens 14, and the horizontal axis indicates the time. In an example of FIG. 7, the position Lb of the focus lens 14 corresponding to the reference focused position is assumed to be L2. Alternatively, a position other than the above may also be used as the position of the focus lens 14 corresponding to the reference focused position.

In other words, at the times t10 to t11, for the image captured by the CCD image sensor 15, the first field is the odd-numbered field and the first process is prosecuted. Thus, with the process at the step S54, the counter L is set for Lmin=L0, and the focus lens 14 is set at the corresponding position. In the next timing at the times t11 to t12, for the image captured by the CCD image sensor 15, the second field is the even-numbered field. Hence, the focus lens 14 is set to the position Lb ($\cong$L2) of the focus lens 14 corresponding to the reference focused position.

Moreover, at the times t12 to t13, for the image captured by the CCD image sensor 15, the third field is the odd-numbered field and not the first process. Thus, at a step S64, the counter L is incremented by d and set to L1. Hence, the focus lens 14 is moved from the position L0 to the position L1.

Next, at the times t13 to t14 of the next timing, for the image captured by the CCD image sensor 15, the fourth field is the even-numbered field. Thus, the focus lens 14 is set to the position Lb ($\cong$L2) of the focus lens 14 corresponding to the reference focused position.

Similarly, at the times t14 to t15, for the image captured by the CCD image sensor 15, the fifth field is the odd-numbered field and not the first process. Thus, at the step S64, the counter L is incremented by d and set to L2. Hence, the focus lens 14 is moved from the position L1 to the position L2.

Hereafter, at the times t15 to t16, t17 to t18, t19 to t20, and t21 to t22, for the images captured by the CCD image sensor 15, the sixth, eighth, tenth and twelfth fields are the even-numbered fields. Thus, the focus lens 14 is set for the position Lb of the focus lens 14 corresponding to the reference focused position.

Further, at the times t16 to t17, t18 to t19 and t20 to t21, for the images captured by the CCD image sensor 15, the seventh, ninth and eleventh fields are the odd-numbered fields and not the first process. Thus, at the step S64, the counter L is sequentially incremented by d and sequentially set for L=L3, L4 and L5. Consequently, at the timings of the respective t16, t18 and t20, the focus lens 14 is moved and set from the position Lb to the position L3, from the position Lb to the position L4, and from the position Lb to the position L5, respectively.

Next, at the times t22 to t23, the thirteenth field is the odd-numbered field and not the first process. Thus, at the step S64, the counter L is sequentially incremented by d and set to the counter L=L5+d. However, it is judged to be the maximum value Lmax or more at the step S65 and the counter L is set to Lmin=L0 at the step S54. As a result, the focus lens 14 is moved from the position L2 to the position L0. Hereafter, the similar processes are repeated.

With the foregoing processes, when a field of the even-numbered field is captured, the focus lens 14 is moved to the position Lb of the focus lens 14 corresponding to the reference focused position as indicated by a thick hatching line in FIG. 7. When a field of the odd-numbered field is captured, as indicated by a thin solid line in FIG. 7, the position of the focus lens 14 is varied gradually. As a result, when the field of the even-numbered field is captured with the process at the step S67, the switch 23 is connected to the terminal 23a. When the focus lens 14 is set to the position of the focus lens 14 corresponding to the reference focused position, the image sent by the CCD image sensor 15 is sent to the composing unit 21. When the field of the odd-numbered field is captured with the process at the step S56, the switch 23 is connected to the terminal 23b, and the image of the imaging field immediately before (=the even-numbered field), which is captured in the state where the focus lens 14 is set to the position of the focus lens 14 corresponding to the reference focused position and stored in the RAM 16, is sent to the composing unit 21. Accordingly, although the focus lens 14 is moved by the one field unit, the display 22 displays thereon only the image of the even-numbered field which is captured in the state where the focus lens 14 is set to the position Lb corresponding to the reference focused position. Thus, only the focused image is displayed. Accordingly, it is possible to prevent from displaying images which may be obtained during a period of moving the focus lens 14 for detection of the focused position and may not be in focus.

Figure 8:
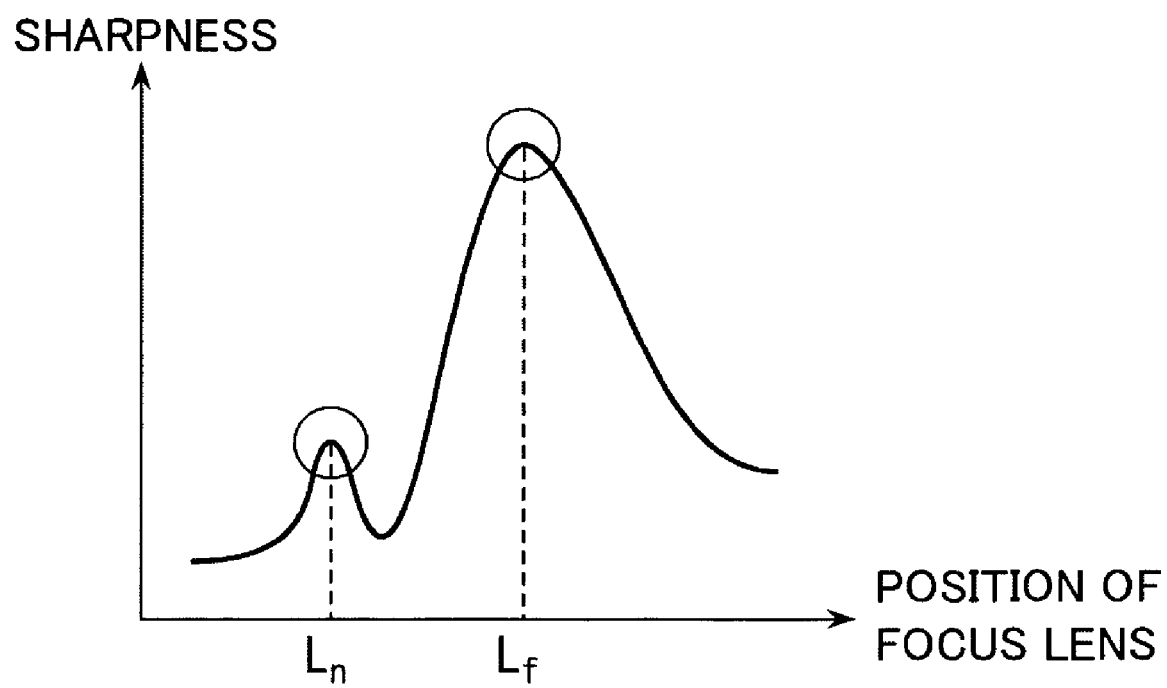
FIG. 8 is a view explaining a sharpness distribution.

On the other hand, at the timing of the odd-numbered field, the processes at the steps S59 to S60 are repeated based on the images captured at the sequentially different positions of the focus lens 14. For example, the sharpness distribution shown in FIG. 8 is generated, and the focused position is determined based on this sharpness distribution at the step S61. In FIG. 8, the vertical axis indicates the evaluation value indicating the sharpness, and the horizontal axis indicates the position of the focus lens. For example, when the sharpness distribution is obtained as shown in FIG. 8, the local maximum value or maximum value is obtained at positions Ln, Lf of the focus lens in FIG. 8. Thus, the positions Ln, Lf are selected as the focused positions.

Figure 9:
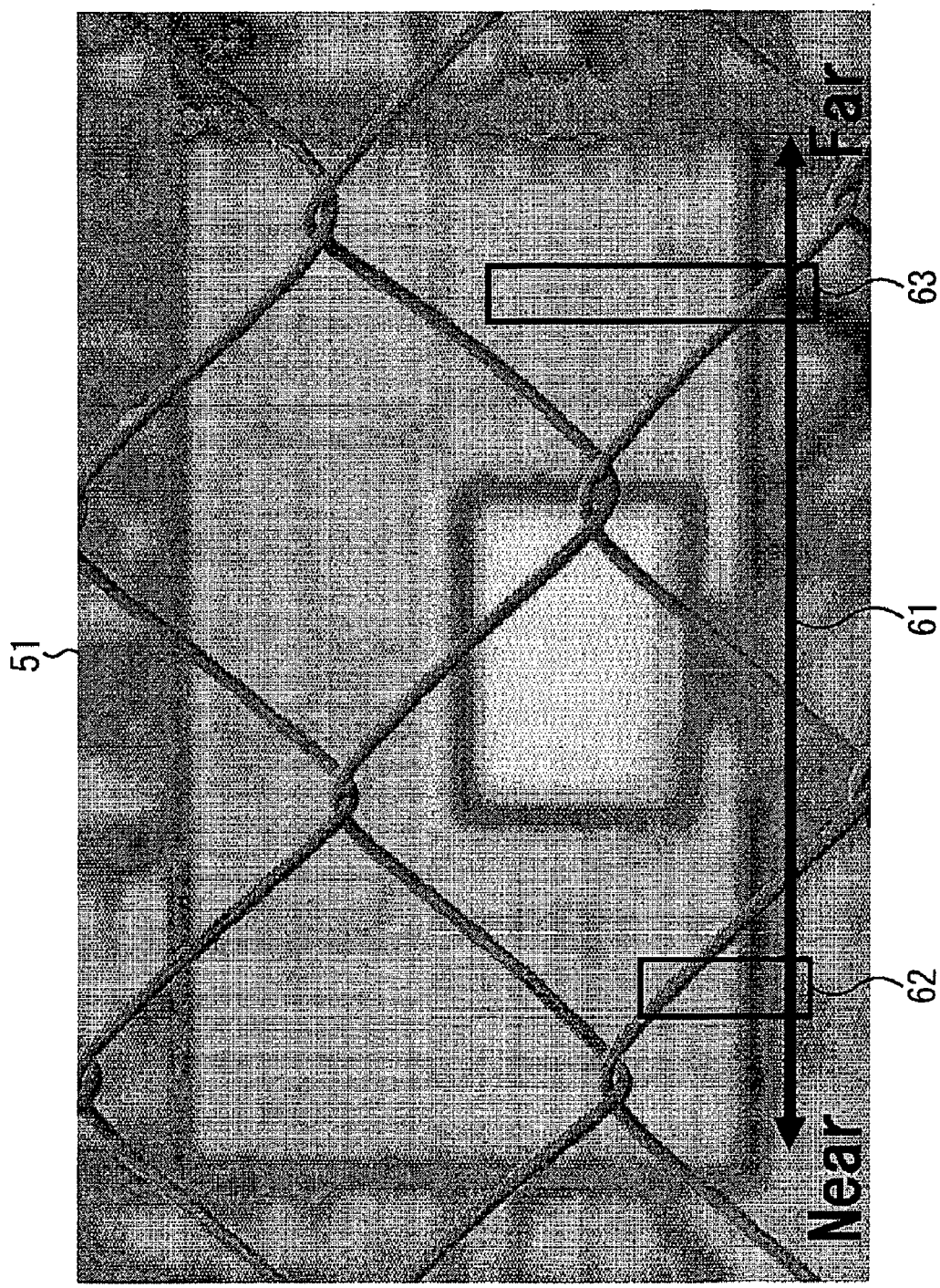
FIG. 9 is a view showing an image example displayed on a display in FIG. 1.

Moreover, an image such as one shown in FIG. 9, for example, is displayed on the display 22 by generating the focused position display image with the process at the step S62 and combining the generated image with the captured image by superimposing with the process at the step S63. Here, an image 51 of FIG. 9 is an image of a wire net fence located in the front and a basket ball goal in the back is captured. Moreover, in FIG. 9, the focused position display image, on which the captured image is superimposed, is displayed with an arrow straight line 61 which are drawn in the right and left direction at the lower portion and are noted as "Near" at the left end and as "Far" at the right end, respectively and with columns 62, 63 indicating the focused positions.

The straight line 61 is a scale indicating the position of the zooming lens 14 (or serves as a scale indicating the focused position). Each of the columns 62, 63 indicates the focused position. For example, if the sharpness distribution is indicated as shown in FIG. 8, the column 62 corresponds to the position Ln, and the column 63 corresponds to the position Lf, respectively. Further, the length in the vertical direction in FIG. 8 of each column represents the magnitude of the evaluation value. Moreover, the columns 62, 63 may be selected by using a predetermined pointer or the like with the operating unit 25.

Accordingly, by displaying the focused position display image superimposed on the captured image on the display 22, a user may be able to recognize a plurality of the focused positions in an image of the current imaging field only by viewing the displayed image depending on the position of the focus lens 14. The focused position, which is a position of a subject that can be focused, is adjusted by the focus lens 14, and the focal distance of the entire optical system is adjusted by the zooming lens.

The description returns to the flowchart of FIG. 2.

At the step S3, the driver controller 26 judges whether or not the focused position is changed. In other words, for example, if the image 51 as shown in FIG. 9 is displayed on the display, the driver controller 26 judges whether or not the operating unit 25 is operated and a column indicating the focused position which is not the column corresponding to the current reference focused position is selected. If the current reference focused position is the focused position corresponding to the column 62 (in the case of Lb=Ln) and if the column 63 is selected, the focused position is judged to be changed, and the process proceeds to the step S4.

At the step S4, the driver controller 26 moves the focus lens 14 to the position Lf corresponding to the new (selected) focused position, and at the step S5, sets the moved position as the position Lb of the focus lens 14 corresponding to the reference focused position. The process returns to the step S2.

Figure 10:
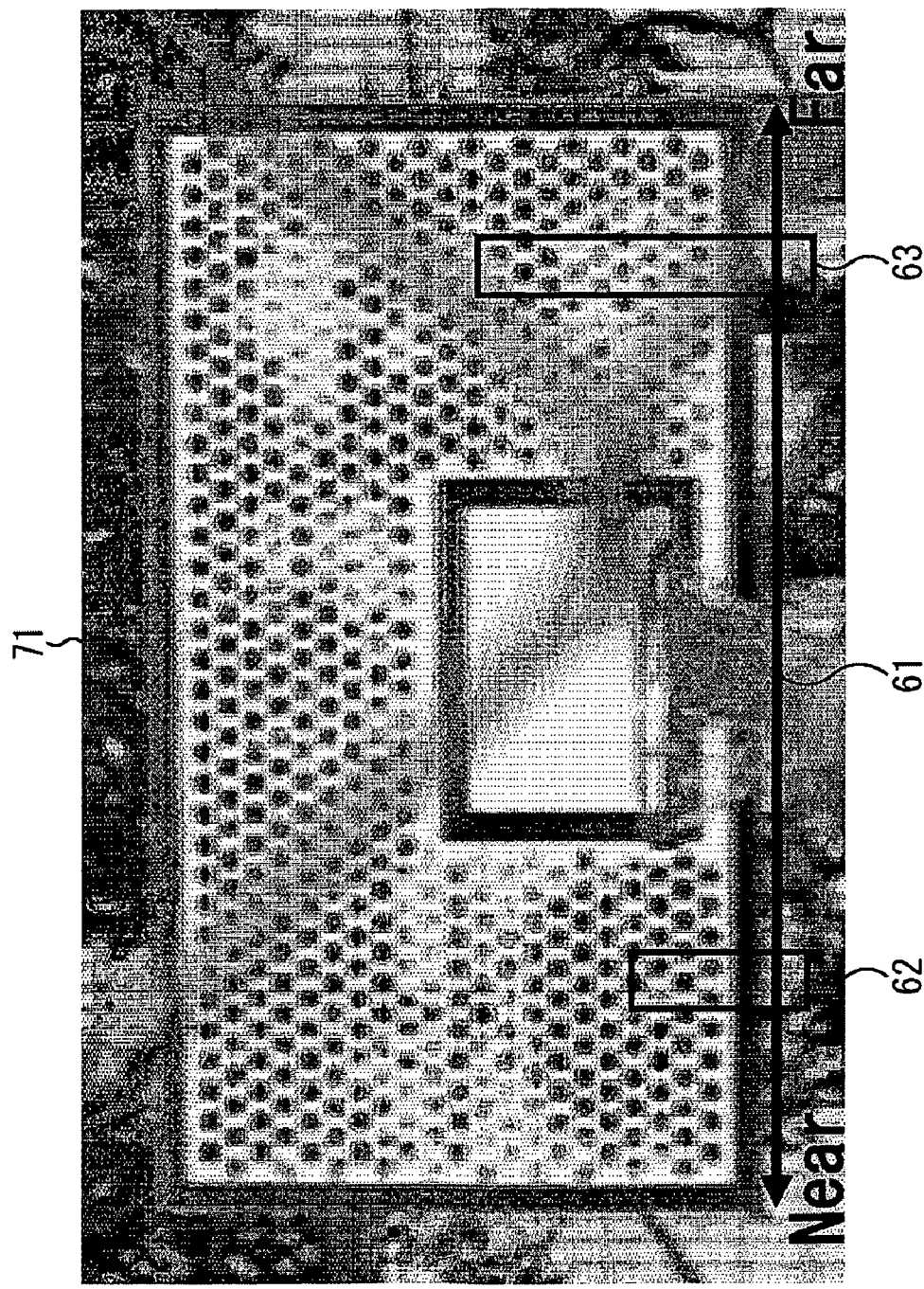
FIG. 10 is a view showing an image example displayed on the display in FIG. 1.

In other words, with the process at the step S4, the focus lens 14 is moved to the position Lf indicated in the sharpness distribution shown in FIG. 8. The image in which the subject existing on the deeper side is brought into focus, for example, as shown in FIG. 10, is displayed. Here, an image 71 of FIG. 10 becomes the image in which the basket goal existing in the back side of the fence is brought into focus, and the front fence is not in focus. Further, with the process at the step S5, the position Lf of the focus lens 14 in which the basket goal in this state is in the focused state is set as the position Lb of the focus lens 14 corresponding to the reference focused position, and the processes on and after the step S2 are repeated.

With the above-mentioned processes, the user is allowed to view the focused position display image displayed on the display 22 and select an arbitrary focused position from a plurality of the focused positions, and further switch and display the image for the selected focused position.

The explanation returns to the flowchart of FIG. 2.

If the focused position is not changed at the step S3, at the step S6, the driver controller 26 judges whether or not the operating unit 25 is operated and the zoom is changed. If the zoom magnification is changed, at the step S7, the zooming lens 12 is operated on the basis of the changed magnification, and data of the focused positions is changed (cleared) at the step S8. Next, the process returns to the step S2. In other words, if the position of the zooming lens 12 is changed, the focal distance of the optical system changes and the sharpness distribution also changes, which consequently disables the use of the data of the focused positions until that time (more specifically, the sharpness distribution). Accordingly, the process at the step S8 changes (clears) the sharpness distribution that is the focused position data until that time, and the process at the step S2 redetects the focused position at the new position of the zooming lens 12 (newly determines the sharpness distribution). If the property of the zooming lens 12 is already known, the new position of the zooming lens 12 may be calculated and the data of the focused positions until that time (the sharpness distribution) may be changed. At this time, the data of the focused positions (the sharpness distribution) may be continuously held.

At the step S6, if the zoom is judged not to be changed, the driver controller 26 judges whether or not the end of the image capturing is instructed at the step S9. If the end of the image capturing is instructed, the process is ended. Further, at the step S9, if the end of the image capturing is not instructed, the process returns to the step S2. The processes on and after this are repeated.

In other words, with the process at the step S1, at first, the image captured in the situation such that the nearest subject in the capture range is brought into focus from the optical block is displayed, and, in that state, a plurality of focused positions are detected by the process at the step S2. At this time, for example, since the image 51 of FIG. 9 is displayed on the display 22, the focused position display image indicating the information of the focused positions is superimposed and displayed on the image at the initial stage. Thus, the distance of the focused position, the number of the focused positions and the evaluation level of the sharpness at the focused position may be recognized on the basis of the positions, number and sizes of the columns. Further, the selection of the column enables the position of the focus lens 14 to be switched to the desirable focused position among the plurality of focused positions. Thus, for example, the selection of the column 63 enables the displayed image to be switched from the image 51 of FIG. 9 to the image 71 of FIG. 10, and enables the easy selection of the image at any focused position.

As a result, in the present embodiment, only the selection of the focused position within the displayed image is necessary for switching the focus point in order to display an image for an arbitrary subject among a plurality of subjects existed in the same field.

Figure 11:
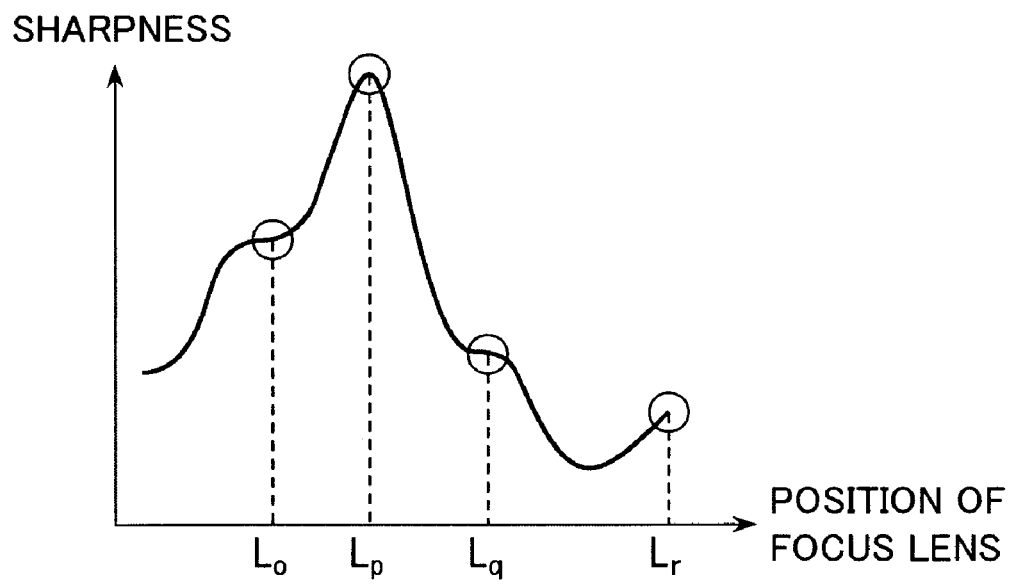
FIG. 11 is a view explaining a sharpness distribution.

The foregoing description has been explained for the case such that there are two local maximum values or maximum values within the sharpness distribution and their corresponding positions are regarded as the focused positions. However, in the sharpness distribution, not only the local maximum value or maximum value, but also an inflection point may be regarded as the focused position. In other words, if the sharpness distribution as shown in FIG. 11 is obtained, positions Lo, Lp and Lq may also be recognized as the focused positions, respectively. Typically, the focused position is the focal position where the sharpness of the image captured while the focal position is being varied has the local maximum value or maximum value. However, if they are superimposed, namely, if a plurality of focused positions exist in the same imaging field, there may be a case such that the local maximum values or maximum values are superimposed on each other. In such a case, a region having the maximum value or local maximum value may be superimposed on an increasing region or decreasing region, thereby causing an inflection point therein. Accordingly, it may be considered that the local maximum value or maximum value exists in a vicinity of the inflection point.

Alternatively, the infinitely remote position such as the position Lr in FIG. 11 where the sharpness increases monotonously may be regarded as the focused position.

In the foregoing description, since the position of the focus lens 14 is changed for each field, there may be possibility such that the movement of the focus lens 14 within the exposure period of the CCD image sensor 15 is not completed.

Figure 12:
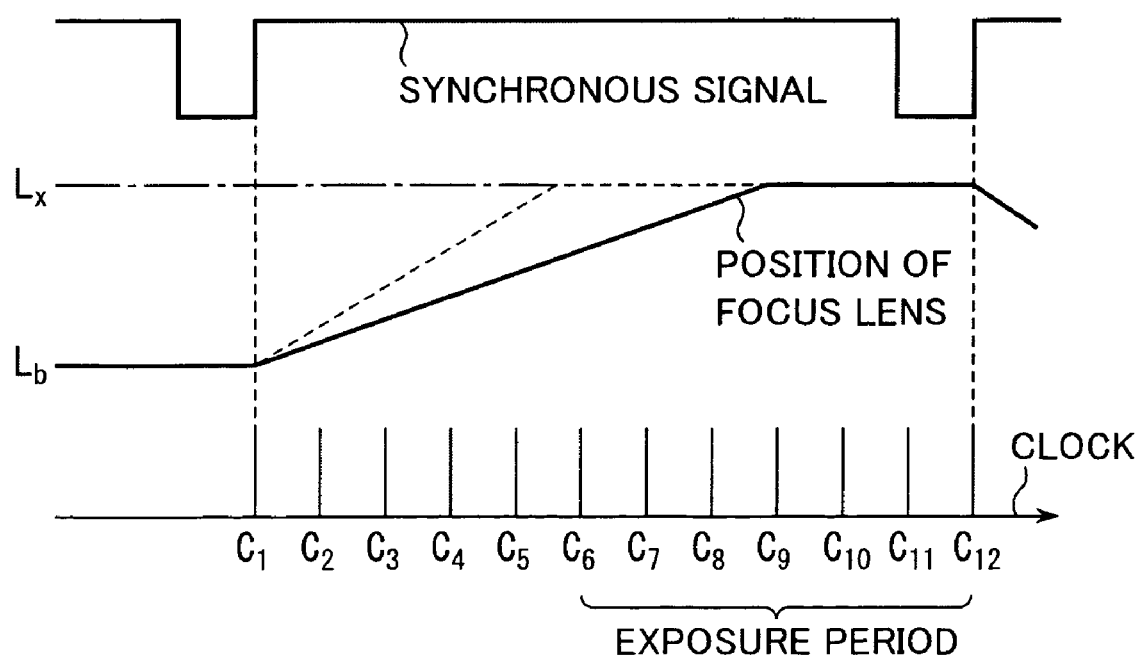
FIG. 12 is a view explaining an adjusting method of an exposure time of a CCD image sensor in association with a movement speed of a focus lens.

As an example, as shown in FIG. 12, a case such that the focus lens 14 is moved from the position Lb to Lx is considered below. In FIG. 12, the upper portion indicates a synchronization signal, the middle portion indicates the position of the focus lens 14, and the bottom portion indicates a clock for counting the exposure period of the CCD image sensor 15. The middle portion of FIG. 12 indicates the position of the focus lens 14 corresponding to the clock for counting the exposure period of the CCD image sensor 15 at the bottom portion.

Figure 13:
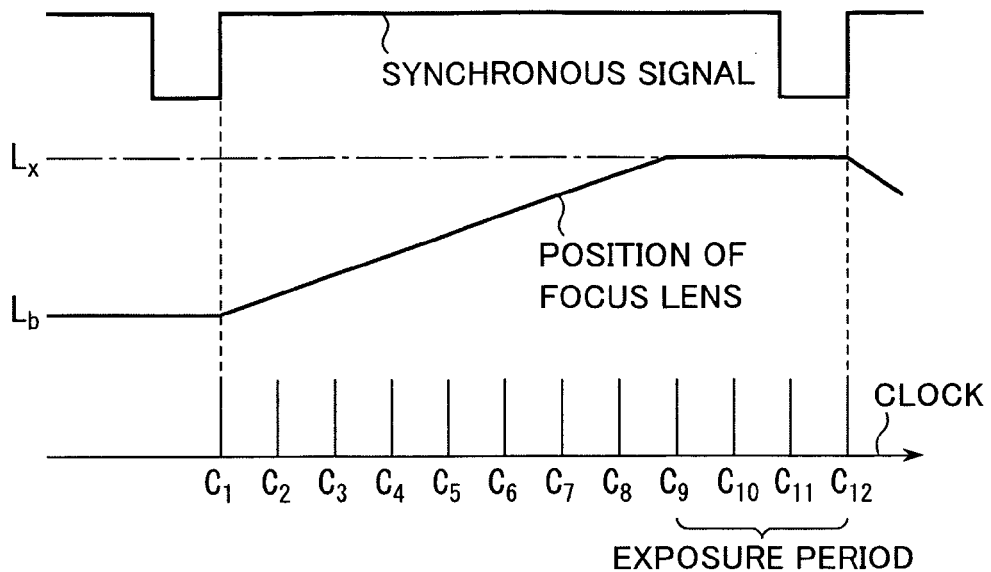
FIG. 13 is a view explaining an adjusting method of the exposure time of the CCD image sensor in association with the movement speed of the focus lens.

As represented by a solid line in FIG. 12, in the present example, it is assumed that, at a clock C1 of the timing when the synchronization signal rises up, the focus lens 14 starts moving from the position Lb to the position Lx. Further, at this time, if it is assumed that the exposure period of the CCD image sensor 15 is for the clocks C6 to C12, the focus lens 14 becomes the exposure state during the movement to the position Lx in the period of the clocks C6 to C9. Thus, the CCD image sensor 15 cannot accurately capture the image when the focus lens 14 is set to the position Lx. In this case, for example, as represented by a dotted line in FIG. 12, the actuator 29 that can be operated at a high speed and enables to complete of the movement of the focus lens 14 until the clock C6 may be used. However, there is possibility of increasing a cost. Accordingly, in this case, as shown in FIG. 13, the exposure period may be reduced to the clocks C9 to C12 so as to enable to start the image capturing after the completion of the movement to the position Lx of the focus lens 14. Hence, without increasing the cost of hardware such as the actuator 29 and the like, it is possible to attain the accurate image capturing in the situation where the focus lens 14 is set to the position Lx.

In the foregoing description, in the process at the step S1 in the flowchart of FIG. 2, the reference focused position is defined as the focused position whose focal distance is for the most front location. However, the present invention is not limited thereto. Alternatively, the focused position may exist at the deepest location, or if the sharpness increases monotonously as mentioned above, the position of the focus lens 14 at the infinitely remote distance may be defined as the reference position. Further, the order of changing the position of the focus lens 14 may be changed, for example, not only from the positions L0 to L5 in FIG. 4 but also from L5 to L0. Moreover, after the arrival at the position L0 to L5, the order may be changed from L5 to L0 to restart from L0 to L5. This mechanism allows to reduce the maximum distance of movement of the focus lens. Accordingly, it is possible to minimize the decrease of the exposure period as explained by referring to FIGS. 12, 13.

Further, in the above-mentioned description, the case has been explained in which the counter L indicating the position of the focus lens 14 is incremented by the interval d and in association with this, the focus lens 14 is moved by the interval d. However, the present invention is not limited to the case where the focus lens 14 is always moved at the interval d of the equal amount. Alternatively, the counter L may be changed by non-equal intervals, and the focus lens 14 may be moved by non-equal intervals.

Moreover, in the above-mentioned description, as shown in FIG. 7, the case has been explained in which the images of the even-numbered field are displayed on the display 22, and the images of the odd-numbered field are used to determine the focused position. However, the present invention is not limited thereto. Alternatively, images of the odd-numbered field may be displayed on the display 22, and images of the even-numbered field may be used to determine the focused position. Furthermore, images of every other fields may be displayed or used for determined the focused position. Further, images of fields having an interval other than anything described above may also be displayed or used for determining the focused position.

Further, in the above-mentioned description, the example of using the CCD image sensor 15 as the device for capturing an image has been explained. Alternatively, a different image sensor may also be used. For example, instead of the CCD image sensor 15, a CMOS (Complementary Metal Oxide Semiconductor) may be used. The similar effect may be achieved as in the case of the CCD image sensor 15.

According to the present invention, even if there are a plurality of subjects within an imaging field, which may serve as a plurality of focused positions, it is possible to detect the focused position without making the displayed image illegible, and to properly and easily set an arbitrary subject to the focused position.

Although the foregoing series of image capturing processes may be executed by hardware, they may also be executed by software. If the series of the processes are executed by the software, programs constituting the software are installed from a recording medium or media to a computer assembled with dedicated hardware or a general purpose personal computer or the like, which can perform various functions by installing various programs.

Figure 14:
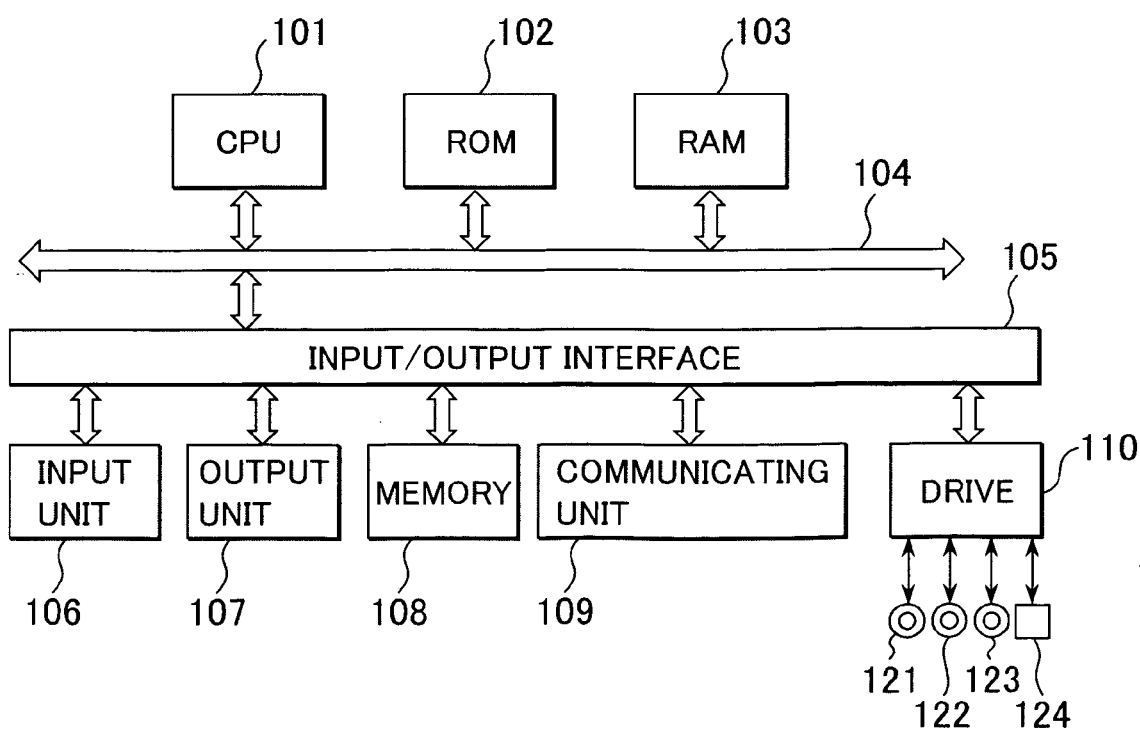
FIG. 14 is a block diagram showing a configuration of a general purpose personal computer.

FIG. 14 shows a configuration example of a general purpose personal computer. A CPU (Central Processing Unit) 101 is built in this personal computer. An input output interface 105 is connected through a bus 104 to the CPU 101. A ROM (Read Only Memory) 102 and a RAM (Random Access Memory) 103 are connected to the bus 104.

An input unit 106 including input devices such as a keyboard, a mouth and the like for a user to input an operation command, an output unit 107 for outputting an image of a processing operation screen or a processed result to a displaying device, a memory 108 including a hard disc drive for storing a program and various data and the like, and a communicating unit 109, which may include a LAN (Local Area Network) adaptor and the like, for executing a communicating process through a network represented by the Internet are connected to the input output interface 105. Further, a drive 110 is connected for reading and writing a data from and to the recording media, such as a magnetic disc 121 (including a flexible disc), an optical disc 122 (including CD-ROM (Compact Disc-Read Only Memory), DVD (Digital Versatile Disc), Blu-Ray Disc and HD (High-definition)-DVD), a magneto-optical disc 123 (MD (Mini Disc), a semiconductor memory 124 and the like.

The CPU 101 executes the various processes based on a program stored in the ROM 102, or a program which is read out from the magnetic disc 121, optical disc 122, magnet-optical disc 123 and semiconductor memory 124 and installed into the memory 108 and loaded from the memory 108 to the RAM 103. The RAM 103 temporary stores data required for execution of various processes by the CPU 101.

In this specification, at the steps of describing a program recorded in a recording medium, the processes may be carried out not only in time series along the order of mention but also executed not in the time series manner. Alternatively, the processes may also be executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   focal position adjusting means for adjusting a focal position of an optical system to a predetermined position in a first image capture period and adjusting so as to change the focal position of the optical system in a second image capture period;
   displaying means for displaying an image captured in the first image capture period;
   distribution generating means for generating a distribution of sharpness corresponding to focal positions based on an image captured in the second image capture period; and
   focused position detecting means for detecting the focal position of the optical system, at which an image of a subject is in focus, based on distribution of sharpness corresponding to focal positions generated by the distribution generating means.

2. The image capturing apparatus according to claim 1, wherein:
   the first image capture period and the second image capture period are alternately repeated.

3. The image capturing apparatus according to claim 1, wherein:
   the focal position adjusting means adjusts the focal position of the optical system by moving the position of a focus lens.

4. The image capturing apparatus according to claim 1, wherein:
   the focal position adjusting means adjusts the focal position of the optical system relative to an image capturing device by moving the position of the image capture device.

5. The image capturing apparatus according to claim 1, wherein:
   the focal position adjusting means adjust the focal position of the optical system relative to an image capturing device by changing a form of the optical system.

6. The image capturing apparatus according to claim 3, wherein:
   in the second image capture period, the focal position adjusting means adjusts the focal position by moving the position of the focus lens with non-equal intervals.

7. The image capturing apparatus according to claim 1, further comprising:
   focused position display image generating means for generating a focused position display image that indicates focused positions detected by the focused position detecting means.

8. The image capturing apparatus according to claim 7, further comprising:
   image composing means for combining the focused position display image generated by the focused position display image generating means and the image captured in the first image capture period;
   wherein the display means display the image captured in the first image capture period that is combined with the focused position display image.

9. The image capturing apparatus according to claim 1, further comprising:
   selecting means for selecting a focused position from the focused position display image generated by the focused position display image generating means;
   wherein the focal position adjusting means adjust the focal position of the image captured in the first image capture period to a focal position corresponding to the focused position selected by the selecting means.

10. The image capturing apparatus according to claim 1, further comprising:
    zoom setting means for controlling zoom operation of the optical system;
    wherein the focal position adjusting means adjusts the focal position of the optical system to a predetermined position in response to the zoom status set by the zoom setting means in the first image capture period, and recalculates the focused position of the optical system obtained in the second image capture period in response to the zoom status set by the zoom setting means.

11. The image capturing apparatus according to claim 1, further comprising:
    zoom setting means for controlling zoom operation of the optical system;
    wherein the focal position adjusting means adjusts the focal position of the optical system to a predetermined position in response to the zoom status set by the zoom setting means in the first image capture period, and adjusts a range in which the focal position of the optical system is varied in response to the zoom status set by the zoom setting means in the second image capture period.

12. An image capturing method comprising the steps of:
    adjusting a focal position of an optical system to a predetermined position in a first image capture period and adjusting so as to change the focal position of the optical system in a second image capture period;
    displaying an image captured in the first image capture period;
    generating a distribution of sharpness corresponding to focal positions based on an image captured in the second image capture period; and
    detecting the focal position of the optical system, at which an image of a subject is in focus, based on the generated distribution of sharpness corresponding to focal positions.

13. A recording medium storing a computer readable program, the program comprising:
    a focal position adjusting control step of controlling an adjustment of a focal position of an optical system to a predetermined position in a first image capture period and an adjustment to change the focal position of the optical system in a second image capture period;
    a display control step of controlling a displaying of an image captured in the first image capture period;
    a distribution generation control step of controlling a generation of a distribution of sharpness corresponding to the focal positions based on the image captured in the second image capture period; and
    a focused position detection control step of controlling a detection of the focal position of the optical system, at which an image of a subject is in focus, based on the distribution of sharpness corresponding to focal positions generated by the process of the distribution generation control step.

14. A program embodied in a computer-readable medium to control a processor to implement a method comprising:
- a focal position adjusting control step of controlling an adjustment of a focal position of an optical system to a predetermined position in a first image capture period and an adjustment to change the focal position of the optical system in a second image capture period;
- a display control step of controlling a displaying of an image captured in the first image capture period;
- a distribution generation control step of controlling a generation of a distribution of sharpness corresponding to the focal positions based on the image captured in the second image capture period; and
- a focused position detection control step of controlling a detection of the focal position of the optical system, at which an image of a subject is in focus, based on the distribution of sharpness corresponding to focal positions generated by the process of the distribution generation control step.

15. An image capturing apparatus comprising:
- a focal position adjusting device operable to adjust a focal position of an optical system to a predetermined position in a first image capture period and change the focal position of the optical system in a second image capture period;
- a display operable to display an image captured in the first image capture period;
- a distribution generator operable to generate a distribution of sharpness corresponding to focal positions based on an image captured in the second image capture period; and
- a focused position detector operable to detect the focal position of the optical system, at which an image of a subject is in focus, based on the generated distribution of sharpness.

* * * * *